United States Patent
Tkacik

Patent Number: 5,444,097
Date of Patent: Aug. 22, 1995

[54] POROUS POLYMERIC STRUCTURES AND A METHOD OF MAKING SUCH STRUCTURES BY MEANS OF HEAT-INDUCED PHASE SEPARATION

[75] Inventor: Gabriel Tkacik, Bedford, Mass.

[73] Assignee: Millipore Corporation, Bedford, Mass.

[21] Appl. No.: 909,904

[22] Filed: Jul. 7, 1992

[51] Int. Cl.⁶ .................. C08J 9/26; B01D 39/14
[52] U.S. Cl. .......................... 521/61; 521/63; 521/64; 264/41; 210/500.21; 210/500.23; 210/500.27; 210/500.29; 210/500.38; 210/500.39; 210/500.4; 210/500.41; 210/500.42; 210/500.43
[58] Field of Search .............. 264/41; 521/61, 63, 521/64; 210/500.21, 500.23, 500.27, 500.29, 500.38, 500.39, 500.4, 500.41, 500.42, 500.43

[56] References Cited

U.S. PATENT DOCUMENTS

| | | | |
|---|---|---|---|
| 3,812,224 | 5/1974 | Smith et al. | 264/45 |
| 5,076,925 | 12/1991 | Roesink et al. | 521/61 |

FOREIGN PATENT DOCUMENTS

63-97666  4/1988  Japan.

OTHER PUBLICATIONS

Fifth Annual Meeting of the North American Membrane Society, p. 16N.

*Primary Examiner*—Joseph L. Schofer
*Assistant Examiner*—John M. Cooney, Jr.
*Attorney, Agent, or Firm*—Andrew T. Karnakis; Paul J. Cook

[57] ABSTRACT

Porous polymeric structures are provided along with a method to make such structures comprising heat-induced phase separation of a polymeric solution exhibiting a lower critical solution temperature.

50 Claims, 2 Drawing Sheets

POROUS POLYMERIC STRUCTURES AND A METHOD OF MAKING SUCH STRUCTURES BY MEANS OF HEAT-INDUCED PHASE SEPARATION

FIELD OF INVENTION

The present invention relates to porous polymeric structures. Such structures are widely used as substrates in various applications such as, for example, packings in chromatography, carriers for immobilizing bioreactive components in bioreactor applications, media in extraction or distillation processes, filtration media, etc. More specifically, especially when formed into thin layers of various shapes, such polymeric structures are used as membrane filters which have wide applications, for example in pharmaceutical, electronics and biotechnology industries.

DESCRIPTION OF THE PRIOR ART

Porous polymeric structures are known in the art. These structures are generally classified according to their effective pore size or according to their retentivity i.e., the sizes of particles that are not able to pass through the pores of the porous polymeric structure. Thus, for example, the structures used as filters are classified as reverse osmosis filters or ultrafilters if they retain dissolved matter such as ions, molecules or macromolecules, while they are classified as microporous structures or microfilters if they pass dissolved matter and retain only undissolved particles. The dividing line between microfilters and ultrafilters in terms of pore size is not defined clearly but it is generally agreed to be between 0.01 and 0.05 micrometers. Thus, a microporous structure or a microfilter typically has pore size in the range between about 0.05 and 10 micrometers. Most porous structures used as substrates in chromatography or bioseparations require free passage of macromolecules and therefore, typically are microporous structures.

The porous polymeric structures used as membrane filters have also been classified according to the pore size difference in their two surfaces, i.e. as isotropic or symmetric when the two surfaces have similar pore size, and anisotropic or asymmetric when the two surfaces have different pore size.

The porous polymeric membrane filters may also be classified as supported or unsupported. In a supported membrane, the actual membrane is attached to a strong sheet material of negligible retentivity and permeability.

The porous polymeric structures have also been classified as hydrophilic or hydrophobic. When the hydrophilic structures are brought into contact with water, they will spontaneously wet, i.e. water will displace the air from the pores of the structure without the application of any external force. On the other hand, a positive pressure is required to intrude water into the pores of hydrophobic structures to displace the air.

In comparing the properties of porous structures, two characteristics are used most often: fluid permeability and bubble point. Permeability is defined as the bulk velocity of the fluid flowing through the porous structure at a unit pressure difference across the porous structure. A commonly used unit of permeability is liter/($m^2$·hr·bar). The most common fluids used to measure the permeability are air or water. The bubble point and the mean bubble point, also called mean pore flow pressure, are defined in ASTM method F316-86. The bubble point is the pressure of a gas that is required to displace a liquid from the largest pore of the porous structure. The mean bubble point is the pressure at which the liquid was displaced from such portion of all the pores that the gas flow rate is equal to one half of the gas flow rate through the dry porous structure at the same pressure.

There are several processes for the preparation of porous polymeric structures. Most common processes are based on phase separation of a polymer solution. In such processes, the composition or temperature of a polymer solution is changed in such a way that it becomes thermodynamically unstable and separates into two phases. One of the phases, containing most of the solvent components, is then removed and the other phase, containing most of the polymer, becomes the porous structure. The types of phase separation processes are usually classified into three categories: 1) vapor-induced phase separation (VIPS), also called "dry casting" or "air casting", 2) liquid-induced phase separation (LIPS), mostly referred to as "immersion casting" or "wet casting", and 3) thermally induced phase separation (TIPS), frequently called "melt casting".

VIPS and LIPS processes rely on mass transfer between the components of the cast polymer solution and the precipitant medium present in vapor or liquid state, respectively. TIPS is controlled by temperature change of the polymer solution. The VIPS process has an inherent disadvantage of low mass transfer rate so that the required residence time in the casting machine is long, resulting in a trade-off between long machines with high capital investment or low process rates. The LIPS process is run at relatively higher rates, since the mass transfer between the polymer solution and a liquid precipitant is higher. While this is an advantage in LIPS processes used to make ultrafiltration and reverse osmosis membranes that require high mass transfer rates to create small pore sizes, it is a complication in processes for making microporous structures which typically require moderate mass transfer rates to allow sufficient growth of the dilute phase leading to higher pore sizes in the microporous range 0.05–10 micrometers. In order to make microporous structures using the LIPS process, several ways of overcoming this complication have been devised in the prior art. Using high content of an organic solvent as described in U.S. Pat. Nos. 4,203,847 and 4,340,479 or a straight organic solvent in the immersion bath is one of the common methods. This principle was well analyzed by Wijmans et al., J. Membr. Sci. 14, 263 (1983). The obvious disadvantage of this technique is the use of large volumes of combustible organic liquid requiring an explosion-proof manufacturing facility and the high cost of solvent disposal.

Other methods, which do not require organic solvent in the precipitation bath typically use some form of phase separation in the polymer solution before it is immersed in an aqueous precipitation bath. A controlled addition of a non-solvent into the casting solution to achieve some specified value of turbidity, followed by immersion of such pre-separated polymer solution film into water, is described in U.S. Pat. No. 4,629,563. A combination of LIPS preceded by VIPS, in which humid air is blown onto a cast homogeneous polymer solution until it phase separates, followed by immersion in water is described in U.S. Pat. No. 4,900,449.

The TIPS processes for making microporous structures are based on the well known and described observation that phase separation can be induced by cooling a homogeneous polymer solution. U.S. Pat. No. 4,274,498 describes a method of making microporous structures using a TIPS process. The fact that polymer solutions phase separate upon heating has been described as general polymer solution behavior much later (P. I. Freeman and J. S. Rowlinson, *Polymer,* 1, 20, (1960)). Such polymer solutions that exhibit phase separation upon heating can be characterized by a cloud point temperature, defined as a temperature at which the solution becomes cloudy due to the phase separation. A minimum on the curve of cloud point temperature as a function of polymer concentration is referred to as lower critical solution temperature(LCST). Japanese Patent Application No. 63-97666 describes a special type of a polymer solution exhibiting LCST behavior. This type of solution is composed of four components: a hydrophobic polymer, a hydrophilic polymer compatible with the hydrophobic polymer, a solvent which is capable of dissolving both polymers and an additive which is miscible with the solvent and the hydrophilic polymer, but is a non-solvent for the hydrophobic polymer. According to this patent, leaving out any one of the four components will lead to a solution without a lower critical solution temperature. This disclosure does not teach how to make a porous polymeric structure from a solution of this type. An abstract by J. Qin et al. (Fifth Annual Meeting of the North American Membrane Society, Lexington, Ky., May 17–20, 1992) describes that properties of ultrafiltration membranes made from a polysulfone solution with LCST behavior may be changed if the solution is brought to temperature above its cloud point. However, these membranes are described as protein retentive, having a dense skin characterized by pores much smaller than those typical in microporous membranes. This dense skin is typical in ultrafiltration membranes made without any heat-induced phase separation. Thus, the temperature increase in this method is used as a secondary phenomenon, only to modify the process of making ultrafiltration membranes that is well known in the art.

The prior art of making polymeric structures made of various types of polysulfones and used as microfiltration membranes has been described in U.S. Pat. Nos. 4,629,563 and 4,900,449. U.S. Pat. No. 4,629,563 describes highly asymmetric polysulfone microporous membranes. U.S. Pat. No. 4,900,449 describes symmetric porous membranes made of blends of polyethersulfone and a hydrophilic polymer. These membranes are hydrophilic. U.S. Pat. No. 5,076,925 describes microfiltration membranes made from a blend of polyethersulfone with a hydrophilic polymer. These membranes are hydrophilic as made but the patent describes a post-treatment procedure that allows removal of the hydrophilic polymer and renders the membranes hydrophobic. However, according to the '925 patent, only membranes with water permeabilities lower than 8000 l/(m²·hr·bar) can be made.

SUMMARY OF THE INVENTION

The present invention relates to porous polymeric structures and a process of making such structures by heat-induced phase separation. More particularly, the present invention relates to a process utilizing the thermal behavior of certain polymer solutions characterized by the presence of lower critical solution temperature (LCST) to induce phase separation by temperature increase.

According to the present invention, the process for making the porous polymer structures comprises preparing a homogeneous solution of at least one polymer in a solvent system, said solvent system consisting of at least one component which is a solvent for the polymer, said homogeneous solution exhibiting a lower critical solution temperature; forming the polymeric solution into a desired shape; heating the shaped polymeric solution sufficiently so that it phase separates and becomes cloudy; and removing the components of the solvent system. The homogoeneous solution may optionally contain one or more components which are non-solvents for said polymer.

DETAILED DESCRIPTION OF THE INVENTION

Figure 1:
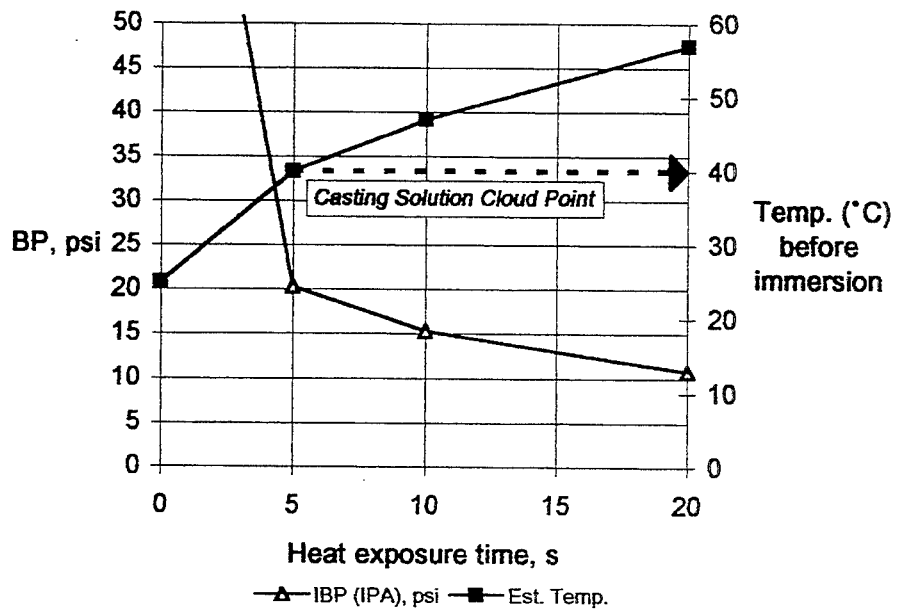
FIG. 1 shows the isopropanol bubble points of porous polymeric membrane samples made using the heat-induced phase separation process of this invention before immersion in the precipitation bath. As represented by the bubble point values, these samples have pore sizes in the microporous range. The control sample made without using this invention is represented by the point at heat exposure times (s)=0. As represented by the bubble point value, this sample has pore size significantly smaller and outside of the microporous range. Corresponding values of casting solution temperature before immersion in the precipitation bath are shown plotted against the second ordinate.

The present invention comprises a process for preparing porous polymeric structures where polymeric structures are prepared utilizing the thermal behavior of certain polymer solutions which is characterized by the presence of lower critical solution temperature. As described hereinabove, the LCST of polymer solutions and blends is a known phenomenon.

LCST of many polymer solutions is more fully described in the paper entitled "Lower Critical Points in Polymer Solutions", Polymer, 1, 20 (1960) by Freeman et al. Other examples of polymer solutions with LCST behavior are described by H. Suzuki et al., The British Polymer Journal, 14, 23 (1982) and LCST behavior of polymer blends with and without solvent has been well analyzed by D. Patterson, in Polym. Eng. Sci. 22, 64 (1982).

The LCST is utilized to induce phase separation by temperature increase. Thus, the process of the present invention comprises: preparing a homogeneous solution of at least one polymer in a solvent system, said solvent system consisting of at least one component which is a solvent for the polymer, said homogeneous solution exhibiting a lower critical solution temperature; forming the polymeric solution into a desired shape; heating the shaped polymeric solution sufficiently so that it phase separates and becomes cloudy; and removing the components of the solvent system. The homogeneous solution may optionally contain one or more components which are non-solvents for said polymer.

The solution is prepared by conventional means, mixing together the polymer with the components of the solvent system. Examples of polymers suitable for solutions exhibiting LCST behavior include polyvinylidene fluoride, cellulose acetate, cellulose nitrate, polyamides, polysulfones, polyacrylonitriles, polyimides, polyolefines and the like.

Examples of the solvent system components that are solvents for the polymer include nitrogen-containing solvents such as dimethylacetamide, dimethylformamide, N-methyl-2-pyrrolidone, etc., or ketones such as acetone, methylethylketone, etc., or esters such as methylacetate, ethylacetate, etc., or other commonly known solvents. In some cases, the solvent might itself be polymeric in nature and in that case the polymer solution can be a polymer blend with or without other components present.

Examples of the components of the solvent system which are a non-solvent for the polymer are water, alcohols, ethers, oligoalkyleneoxides and ethers of oligoalkyleneoxides, polyalkyleneoxides and their ethers. A particularly useful group of compounds suitable as a component of the solvent system are oligoalkyleneoxides of the general formula

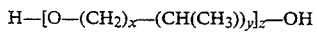
H—[O—(CH$_2$)$_x$—(CH(CH$_3$))$_y$]$_z$—OH and their mono- and dimethylethers, the dimethyl ethers having the general formula

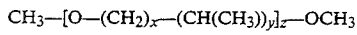
CH$_3$—[O—(CH$_2$)$_x$—(CH(CH$_3$))$_y$]$_z$—OCH$_3$ where x is 1 to 4, y is 0 or 1 and z is 1 to 8.

Whether a component of the solvent system is a solvent or a non-solvent for the polymer depends on the particular polymer, so that the same component in one formulation can serve as a solvent and in another formulation as a non-solvent and vice-versa, depending on the selected polymer.

The resulting homogeneous solution is formed into the desired shape by techniques such as casting, coating, spinning, extruding, etc., which are known in the art. The shaped solution can be in any form such as a block or a cylinder, a flat sheet, a hollow tube, solid or hollow fiber.

As stated above, the shaped solution is heated until phase separation occurs, marked by cloudiness of the solution. In some instances, for reasons of simplicity of process control or convenience, the heating step may occur before, during or after the step of forming the polymer solution into shape.

The components of the solvent system are thereafter removed by methods such as evaporation or extraction and the like. The conditions of the removal process may further affect the later stages of phase separation and influence the properties of the polymeric porous structure. A preferred method for removing the components of the solvent system involves immersing the shaped phase-separated polymeric solution in one or more liquid baths comprising at least one non-solvent for the polymer, the non-solvent being miscible with at least one component of the solvent system.

The porous polymeric structure may then be optionally subjected to additional extraction or drying. The resulting polymeric structure has pores typically in the range of 0.05 to 10 micrometers and exhibits typically high fluid permeability. If the porous polymeric structure is made of polyethersulfone in a thin form, such as is customary in making microfiltration membranes, it can be made with a symmetric pore structure and it will, as described below, exhibit typically a water permeability exceeding 10,000 l/(m$^2$·hr·bar).

From the foregoing description, it can be appreciated that the advantages of the present invention for making microporous structures are quite evident. These include the inherent beneficial properties of the porous structures, such as high permeability, even for structures characterized as having symmetric pore morphology. Further advantages include the simplicity of the process and the inherent ease of control of the pore size for given formulation of the polymer solution, by adjusting the temperature of the polymer solution before the removal of the solvent system components.

In order to further illustrate the practice of this invention the following examples are included.

EXAMPLE 1

Figure 2:
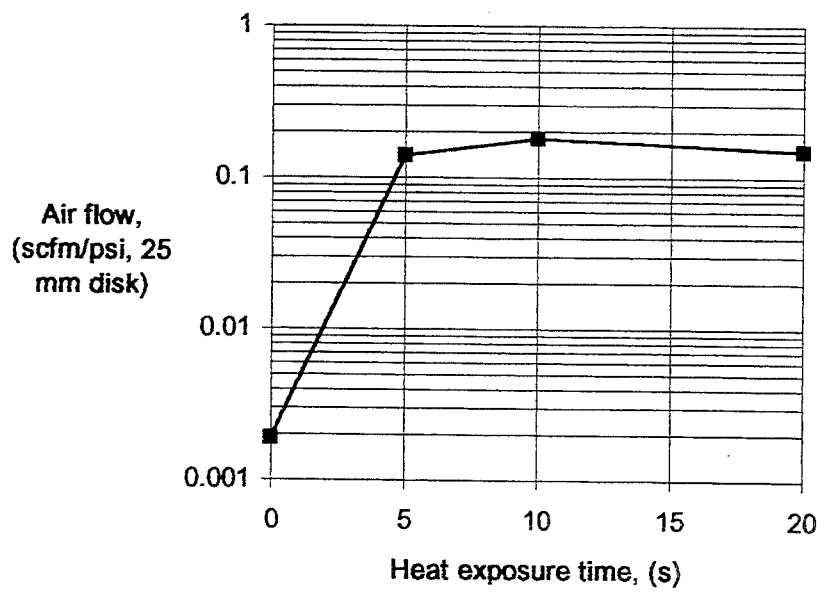
FIG. 2 shows the air permeability of porous polymeric membrane samples made using the heat-induced phase separation process of this invention before immersion in the precipitation bath. The permeability is expressed as flow rate of air (in standard cubic feet per minute—scfm) through a 25 mm disk of membrane at a pressure of 1 pound per square inch. These samples have air permeabilities common for microporous polymeric structures of comparable thickness. The control sample made without using this invention is represented by the point at heat exposure times (s)=0. This sample has air permeability significantly lower than the typical range for microporous polymeric structures of comparable thickness.

A polymer solution has been made from 12 parts of polyethersulfone Victrex 5200P, (ICI Advanced Materials Business Group, Wilmington, Del.), 60 parts of triethylene glycol (Aldrich Chemical, Milwaukee, Wis.) and 28 parts of N-methyl-2-pyrrolidone (GAF). The solution was homogeneous at room temperature and exhibited a cloud point at 40° C. It has been cast onto a 1/32 inch thick aluminum plate using 300 micrometer spacers and a casting rod. The plate was immediately placed on a heated surface kept at approximately 90° C. The temperature of the solution in this stage was estimated by measuring the surface temperature of the aluminum plate as a function of time on the heater plate in a separate experiment. The residence time of the casting solution on the heated surface was varied in repeated casting experiments to values exceeding the time required to reach the cloud point temperature of this casting solution. When the cloud point temperature was exceeded, heat-induced phase separation occurred and the cast polymer solution film became cloudy. After the heating step the film was immersed for 3 minutes into a water bath kept at room temperature, washed in excess of fresh water and dried. The dry membranes did not wet with water. Control membranes were cast without the heating step with immediate immersion and with delayed immersion for a period of time equivalent to the times of heating of the rest of the samples. No difference in properties of control samples made with immediate and delayed immersion was observed, indicating that prolonged ambient air exposure alone does not create the effect described in this invention. The control samples exhibited a bubble point higher than the maximum of the measurement range (FIG. 1) and air permeabilities much lower than typical microfiltration membranes (FIG. 2). The membranes made according to this invention using the heat-induced phase separation had properties in the microfiltration range (FIGS. 1, 2, and Table I).

TABLE I

Properties of porous membrane samples made in Example 1

| | | | | |
|---|---|---|---|---|
| Heating time, s | 0 | 5 | 10 | 20 |
| Solution temperature before immersion, °C | 21 | 40 | 47 | 57 |
| Water permeability*) of the sample, 1/m² · hr · bar) | 410 | 34500 | 88500 | 96900 |

*)Measured after pre-wetting with isopropanol

EXAMPLE 2

Figure 3:
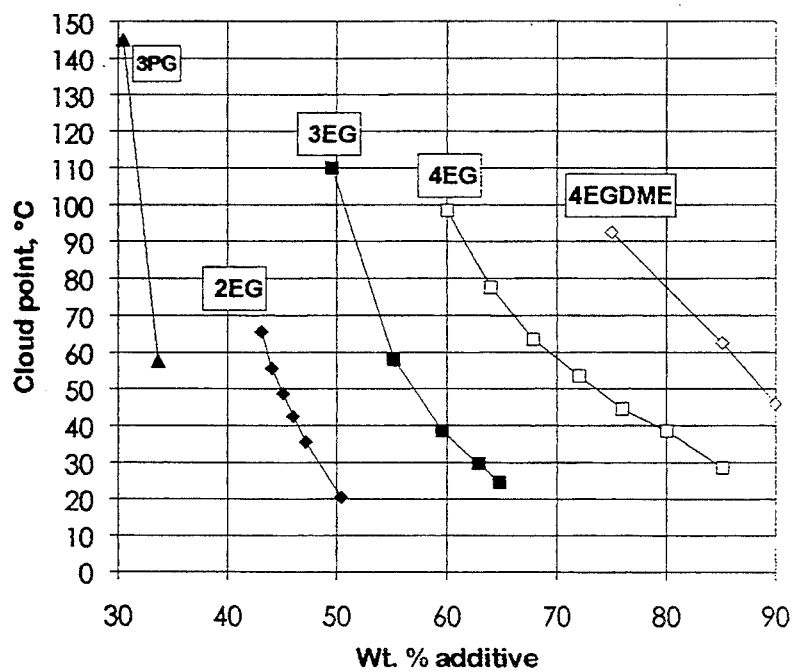
FIG. 3 shows the cloud point values for solutions of polyethersulfone Victrex 5200 dissolved in N-methyl-2-pyrrolidone, containing various amounts of several additives: 3PG=tripropylene glycol, 2EG=diethylene glycol, 3EG=triethylene glycol, 4EG=tetraethylene glycol, 4EGDME=tetraethylene glycol dimethyl ether. The concentration ratio of polyethersulfone to N-methyl-2-pyrrolidone is 3/7 and is constant for all the solutions.

A polymer solution was made from 3 parts of polyethersulfone Victrex 5200 (ICI, Wilmington, Del.) and 7 parts of N-methyl-2pyrrolidone (GAF). The solution was divided into several portions and various amounts of non-solvents were added, the separate portions were then mixed at room temperature until they became homogeneous. The cloud points of the solutions were measured by placing sealed glass containers containing the solutions into a temperature controlled bath and slowly raising the temperature of the bath. FIG. 3 shows the measured cloud points for the following non-solvent additives: 2EG—diethylene glycol, 3EG—triethylene glycol, 3PG—tripropylene glycol, 4EG—tetraethylene glycol, 4EGDME—tetraethylene glycol dimethyl ether. This example demonstrates the range of non-solvent additives suitable for making polymer solutions with LCST behavior.

EXAMPLE 3

Figure 4:
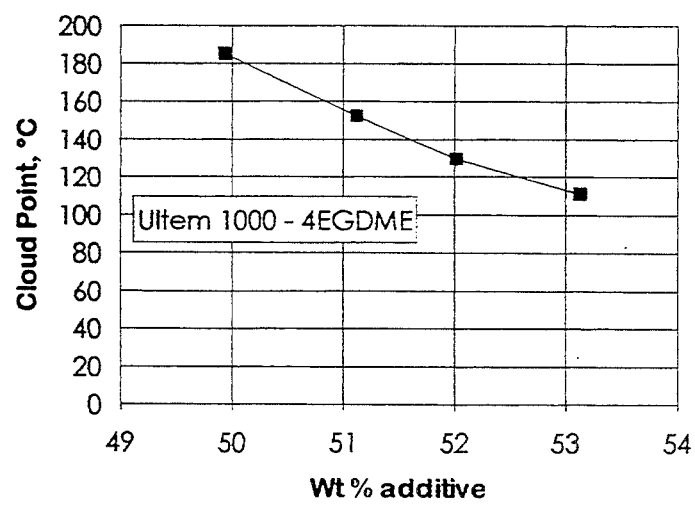
FIG. 4 shows the cloud point values for solutions of polyetherimide Ultem 1000 dissolved in N-methyl-2-pyrrolidone, containing various amounts of the additive tetraethylene glycol dimethyl ether. The concentration ratio of polyetherimide to N-methyl-2-pyrrolidone is 3/7 and is constant for all the solutions.

A solution was made by mixing 3 parts of polyetherimide Ultem 1000 (GE Plastics, Pittsfield, Mass.) with 7 parts of N-methyl-2-pyrrolidone at 70° C. The homogeneous solution was cooled to room temperature, divided into several parts, to which then various amounts of a non-solvent additive, tetraethylene glycol dimethyl ether, were added. The separate solutions were mixed until they became homogeneous and cloud points were measured in a constant temperature bath as in Example 2. FIG. 4 shows the cloud point curve as a function of the amount of the non-solvent additive.

EXAMPLE 4

A solution was made by mixing 90 parts of polyethylene glycol containing an average number of ethylene oxide units between 8 and 9, with 10 parts of polyethersulfone Victrex 5200. A homogeneous solution was obtained, containing only the blend of the two polymers. The cloud point of this solution was 65° C. The solution was cast onto aluminum plates as in Example 1. One plate was then placed on a heated surface for 30 seconds. The temperature of the solution after this time, measured as in Example 1, was 90° C. The other plate was kept at ambient temperature for 30 s. Both plates were then immersed for 3 minutes in a water bath kept at 68° C., then taken out, the polymeric porous films were washed in excess of fresh water and dried. The samples, as judged by scanning electron micrographs, had symmetric pore morphology. The resulting properties of the samples are in Table II:

TABLE II

| | Sample | |
|---|---|---|
| Property | heated before immersion | not heated before immersion |
| Mean isopropanol bubble point, psi | 19.5 | >90 |
| Air permeability scfm/psi, 25 mm disk | 0.060 | 0.015 |

What is claimed is:

1. A process for making microporous polymeric structure having pores of an average size between about 0.05 and 10 micrometers which comprises:
    a) preparing a homogeneous solution of a polymer composition consisting of at lease one polymer in a solvent system, said solvent system consisting of at least one component which is solvent for said polymer composition, and containing zero, one or more components which are non-solvents for said polymer composition, said homogeneous solution exhibiting a lower critical solution temperature,
    b) forming the polymeric solution into a desired shape,
    c) heating the shaped polymeric solution until it phase separates and becomes cloudy, wherein the heating is effected during or after forming the desired shape, and
    d) removing the components of the solvent system from said at least one polymer wherein the removing is effected when said solution is cloudy and either by immersing the shaped, phase-separated polymeric solution in at least one liquid bath comprising at least one non-solvent for the polymer which is miscible with at least one of the components of the solvent system, or by evaporating the components of the solvent system.

2. A process according to claim 1 which includes a step of extraction of the remaining components of the solvent system, along with any other undesirable constituents from the porous polymeric structure.

3. A process according to claim 1 which includes a step of drying of the porous polymeric structure.

4. A process according to claim 1 wherein the shape of the porous polymeric structure is a thin flat sheet.

5. A process according to claim 1 wherein the shape of the porous polymeric structure is a tube.

6. A process according to claim 1 wherein the shape of the porous polymeric structure is a hollow fiber.

7. A process according to claim 1 wherein the shape of the porous polymeric structure has a form of a sphere, a block or a cylinder.

8. A process according to claim 1 wherein the porous polymeric structure is a porous membrane.

9. A process according to claim 8 wherein the membrane is supported on a substrate, said substrate being an integral part of the resulting membrane.

10. A process according to claim 1 in which the polymer is polyethersulfone.

11. A process according to claim 1 in which the polymer is polysulfone.

12. A process according to claim 1 in which the polymer is cellulose acetate.

13. A process according to claim 1 in which the polymer is polyvinylidene fluoride.

14. A process according to claim 1 in which the polymer is cellulose nitrate.

15. A process according to claim 1 in which the polymer is a polyamide.

16. A process according to claim 1 in which the polymer is a polyimide or polyetherimide.

17. A process according to claim 1 in which the polymer is a polycarbonate.

18. A process according to claim 1 in which the polymer is a polyolefin.

19. A process according to claim 1 in which the polymer is a polyacrylonitrile.

20. A process according to claim 1 in which the polymer solution contains an oligoalkyleneoxide or polyalkyleneoxide.

21. A process according to claim 20 in which the oligoalkylene oxide has a general formula $$H-[O-(CH_2)_x-(CH(CH_3))_y]_z-OH$$

where x is 1 to 4, y is 0 or 1 and z is 1 to 8.

22. A process according to claim 20 in which the polyalkylene oxide has a general formula $$H-[O-(CH_2)_x-(CH(CH_3))_y]_z-OH$$

where x is 1 to 4, y is 0 or 1 and z is 8 to 40.

23. A process according to claim 1 in which the polymer solution contains an oligoalkylene oxide ether or polyalkylene oxide ether.

24. A process according to claim 23 in which the oligoalkylene oxide ether has a general formula $$CH_3-[O-(CH_2)_x-(CH(CH_3))_y]_z-OH$$

or $$CH_3-[O-(CH_2)_x-(CH(CH_3))_y]_z-OCH_3$$

where x is 1 to 4, y is 0 or 1 and z is 1 to 8.

25. A process according to claim 23 in which the polyalkylene oxide ether has a general formula $$CH_3-[O-(CH_2)_x-(CH(CH_3))_y]_z-OH$$

or $$CH_3-[O-(CH_2)_x-(CH(CH_3))_y]_z-OCH_3$$

where x is 1 to 4, y is 0 or 1 and z is 8 to 40.

26. A microporous polymeric structure made by a process according to claim 1.

27. A microporous polymeric structure made by a process according to claim 2.

28. A microporous polymeric structure made by a process according to claim 3.

29. A microporous polymeric structure made by a process according to claim 4.

30. A microporous polymeric structure made by a process according to claim 5.

31. A microporous polymeric structure made by a process according to claim 6.

32. A microporous polymeric structure made by a process according to claim 7.

33. A microporous polymeric structure made by a process according to claim 8.

34. A microporous polymeric structure made by a process according to claim 9.

35. A microporous polymeric structure made by a process according to claim 10.

36. A microporous polymeric structure made by a process according to claim 11.

37. A microporous polymeric structure made by a process according to claim 12.

38. A microporous polymeric structure made by a process according to claim 13.

39. A microporous polymeric structure made by a process according to claim 14.

40. A microporous polymeric structure made by a process according to claim 15.

41. A microporous polymeric structure made by a process according to claim 16.

42. A microporous polymeric structure made by a process according to claim 17.

43. A microporous polymeric structure made by a process according to claim 18.

44. A microporous polymeric structure made by a process according to claim 19.

45. A microporous polymeric structure made by a process according to claim 20.

46. A microporous polymeric structure made by a process according to claim 21.

47. A microporous polymeric structure made by a process according to claim 22.

48. A microporous polymeric structure made by a process according to claim 23.

49. A microporous polymeric structure made by a process according to claim 24.

50. A microporous polymeric structure made by a process according to claim 25.

* * * * *